United States Patent [11] 3,573,490

[72] Inventors Leonce J. Sevin, Jr.;
Donald J. Redwine, Dallas, Tex.
[21] Appl. No. 787,712
[22] Filed Dec. 30, 1968
[45] Patented Apr. 6, 1971
[73] Assignee Texas Instruments Incorporated
Dallas, Tex.

[54] CAPACITOR PULL-UP REIGISTER BIT

10 Claims, 11 Drawing Figs.

[52] U.S. Cl. 307/221, 307/279, 307/304
[51] Int. Cl. G11c 19/00, H03k 21/00, H03k 23/08
[50] Field of Search 307/221, 279, 304

[56] References Cited

UNITED STATES PATENTS 3,383,570 5/1968 Luscher 307/279X
3,395,292 7/1968 Bogert 307/279X

*Primary Examiner*—Stanley D. Miller, Jr.
*Assistant Examiner*—John Zazworsky
*Attorneys*—James O. Dixon, Andrew M. Hassell, Harold Levine, Melvin Sharp, John E. Vandigriff, Michael A. Sileo, Jr. and Henry T. Olsen

ABSTRACT: Injection current modes in an MOS capacitor pullup shift register bit are eliminated or minimized by addition of circuit elements between a driver transistor switch and a coupling transistor switch. In one form, this additional circuitry includes a push-pull stage of two transistor switches interconnected between the driver switch and the coupling switch. In an MOS transistor configuration of a shift register, an alloy diode is connected in parallel to the PN diode of the coupling transistor to minimize the effects of injection currents. Injection currents are also controlled in an MOS transistor configuration of a shift register by a P-type diffusion around each transfer stage of a shift register bit.

Patented April 6, 1971 3,573,490

3 Sheets-Sheet 1

INVENTOR
Donald J. Redwine

ATTORNEY

CAPACITOR PULL-UP REIGISTER BIT

This invention relates to shift register circuitry, and more particularly to eliminating or minimizing injection current modes in MOS transistor shift registers.

Shift register systems are well-known logic components that have many uses, among which memory and time delay are but two. A recent development in shift register technology is the capacitor pullup register. This "ratioless" type circuit offers the potential advantage of high-speed, two-phase operation. In the ratio-type shift register systems, large impedance loads are used to limit current flow which results in unacceptably long time constants. For high-speed circuit operations (5 to 10 MHz.), the ratioless-type capacitor pullup register bit provides the required high-speed operation for large system arrays.

Basically, a capacitor pullup shift register bit includes a driver field-effect transistor and a coupling field-effect transistor followed by another driver transistor and coupling transistor, all in cascade. A load capacitor connects each of the driver transistors to an individual source of clock pulses. The clock pulse sources provide all the power required to operate the shift register, thus eliminating the need for DC power supplies.

One problem with the capacitor pullup shift register bit is that of current injection. There are two current injection modes in a shift register bit, one of which can be controlled with relative ease and the second which is difficult to control. The latter has deleterious effects on the output voltage of the register bit. In shift registers with a large number of bits, the second mode current injection will cause the circuit to operate in an unsatisfactory manner. Accordingly, it is an object of this invention to provide a pullup, push-pull shift register bit wherein injection current effects are minimized or eliminated.

Another object of this invention is to provide a ratioless capacitor pullup shift register wherein injection currents are minimized. A further object of this invention is to provide a capacitor pullup, push-pull shift register wherein one injection current mode is eliminated. Still another object of this invention is to provide a MOS capacitor pullup, push-pull shift register.

Metal-oxide-semiconductor (MOS) circuits are constructed in a series of oxide deposition and diffusion steps. The MOS devices are somewhat simpler to fabricate than PN junction-type circuits in that only one diffusion into the substrate is required. Since a capacitor pullup shift register requires only the transistor junctions and capacitors, it is particularly well suited for fabrication using the MOS technique.

In accordance with this invention, an MOS capacitor pullup, push-pull shift register bit includes first and second transfer stages. Each transfer stage has a driver transistor switch and a coupling transistor switch. The coupling transistor switch is controlled into a conduction state by clock pulses connected to a control terminal. One terminal of the driver transistor is connected to the clock pulse source through a load capacitor. An active circuit including two transistor switches in series controls the flow of clock pulse energy to the output terminal of the coupling transistor switch. One of these active circuit transistors connects to the junction of the load capacitor and the driver transistor, and the other active circuit transistor is activated by control pulses at its control terminal. By connecting the junction of the load capacitor and the driver transistor through the active circuit, one of the injection mode currents is eliminated from affecting the output voltage of the coupling transistor.

In accordance with another embodiment of this invention, a capacitor pullup shift register bit includes two interconnected transfer stages. Each transfer stage comprises an MOS driver transistor coupled to the source terminal of an MOS coupling transistor. A load capacitor connects to the junction of the two transistors, and along with the gate terminal of the coupling transistor, connects to a clock pulse source. Injection currents through the PN junction of the driver transistor are minimized by an alloy diode connected between the driver transistor drain terminal and ground.

A more complete understanding of the invention and its advantages will be apparent from the specification and claims and from the accompanying drawings illustrative of the invention.

Referring to the drawings:

FIG. 5 shows a detailed layout of a shift register bit for the circuit of FIG. 5;

Figures 1, 2, 3A, 3B:
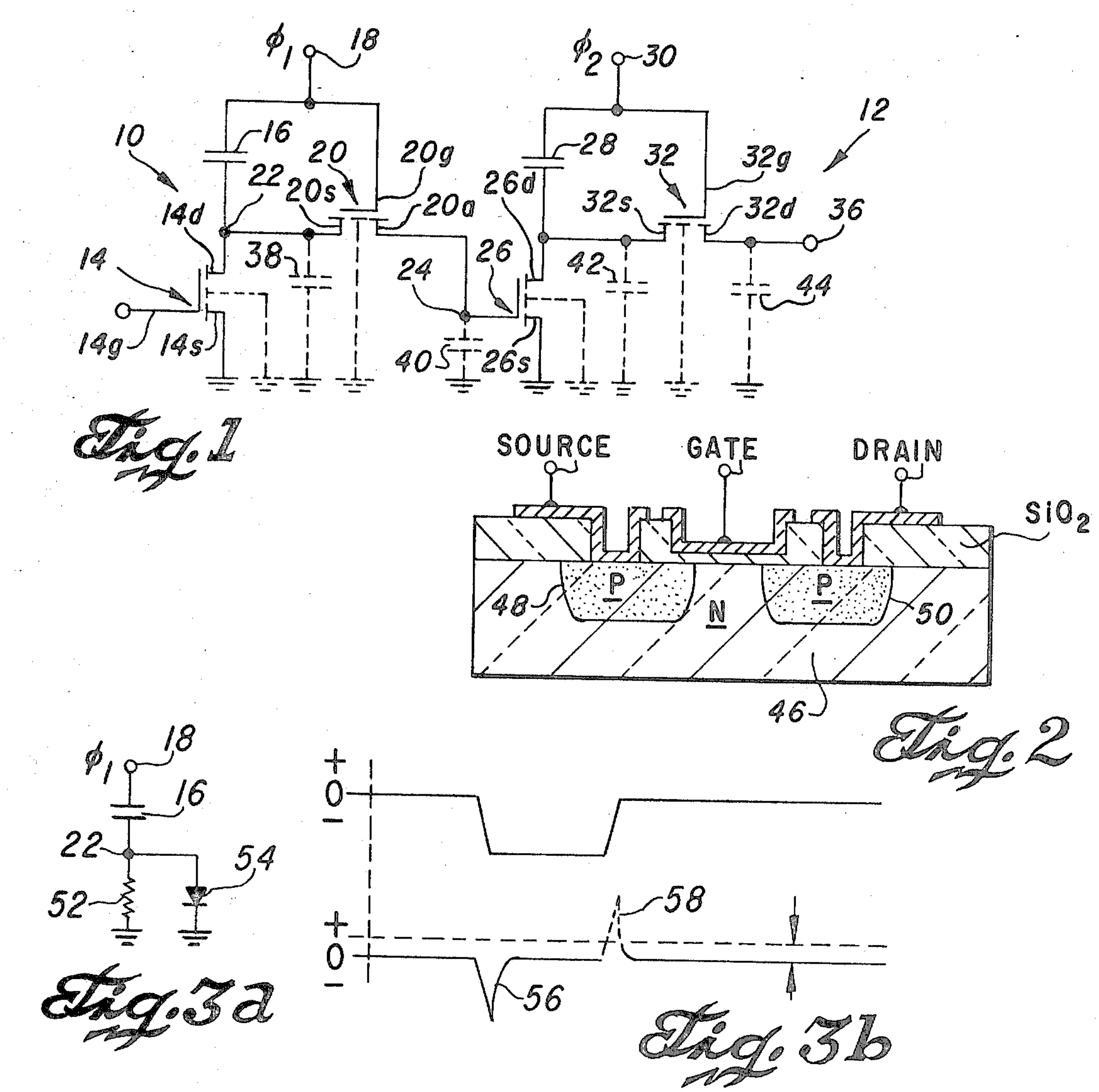
FIG. 1 is a circuit diagram of a "ratioless" capacitor pullup shift register bit.
FIG. 2 is a section of a metal-oxide-semiconductor field-effect transistor.
FIG. 3A is an equivalent circuit for explaining one injection mode current.
FIG. 3B illustrates a clock pulse wave and voltage spikes resulting therefrom that produce one injection current mode.

Referring to the drawings, in FIG. 1 there is shown a ratioless capacitor pullup shift register consisting of a first transfer stage 10 and a second transfer stage 12. Stage 10 includes a driver transistor 14 as an electronic switch activated by control pulses received at a gate terminal **14*g*. A "low" control pulse (typically −10 volts) switches the transistor 14 into the conducting state to complete a low resistance circuit from a drain terminal 14*d* to a source terminal 14*s* connected to ground. The low resistance through the transistor 14 is in series with a load capacitor 16 connected to a source of clock pulses $\Phi_1$ on terminal 18. A clock pulse on the terminal 18 controls conduction of a coupling transistor 20 functioning as an electronic switch to connect the voltage at junction 22 to a terminal 24. In the configuration shown, the gate terminal 20*g* of the transistor 20 connects to the terminal 18, the source terminal 20*s* connects to the junction 22, and the drain terminal 20*d* connects to the terminal 24**.

The transfer stage 12 includes a driver transistor 26 functioning as an electronic switch and activated by the voltage on the terminal 24 through a connection to the gate terminal **26*g*. The transfer stage 12 may be similar to the transfer stage 10 and includes a load capacitor 28 connected to a source of clock pulses $\Phi_2$ occurring at terminal 30 and to the drain terminal 26*d* of the transistor 26. A clock pulse $\Phi_2$ on the terminal 30 controls a coupling transistor 32 functioning as an electronic switch through a connection to the gate terminal 32*g*. When conducting, the transistor 32 couples a voltage at the junction 34 to an output terminal 36. This path consists of a connection between the junction 34 and the source terminal 32*s* and a connection between the output terminal 36 and the drain terminal 32*d***.

Inherent in the structure of MOS field-effect transistors is a certain amount of interelectrode capacitance. Capacitors 38,40,42 and 44 represent nonlinear PN junction capacitors associated with the MOS devices. These capacitors are shown in broken lines to indicate that they represent inherent capacitance and not separate and discrete circuit components.

In operation, assume junction 22 is initially connected to ground through the transistor 14 and the clock pulse $\Phi_1$ is off. Previously, the capacitor 40 had been charged to a level to turn on the transistor 26. Upon the occurrence of a clock pulse $\Phi_1$ at terminal 18 when a control pulse is connected to the drain terminal **14*g*, the transistor 20 will clamp the terminal 24 to ground potential, thus discharging the capacitor 40 and turning off the transistor 26. With the transistor 26 in a nonconducting mode, a clock pulse $\Phi_2$ on terminal 30 causes the junction 34 to be charged through capacitor 28 which, in turn, charges the capacitor 44 through the now conducting transistor 32. A voltage will be stored on the capacitor 44 until the next occurrence of a clock pulse $\Phi_2$ when the transistor 26 is conducting. The transistor 26 will be changed to a conduction state when the transistor 14 turns off and a clock pulse $\Phi_1$ appears at terminal 18. The capacitor 44 will be discharged on the next $\Phi_2$ clock and terminal 36** will return to ground potential.

The complete operation of the circuit of FIG. 1 is such that a time delay occurs between the appearance of the control pulse at the gate terminal 14*g* and the appearance of a pulse at the output terminal 36. The amount of delay is proportional to the frequency of the clock pulses $\Phi_1$ and $\Phi_2$. The above operational sequence is not intended to be a rigorous description of the circuit operation, but, rather, to give a basic understanding of the operation of capacitor pullup shift register bits.

In an MOS configuration; each of the transistors of the circuit of FIG. 1 may be formed in a substrate such as illustrated in FIG. 2. Typically, the N-type silicon substrate 46 includes P-type diffusions 48 and 50 for the source and drain regions, respectively, of a field-effect transistor. The gate region of the MOS transistor is formed by a metallization over a thin oxide layer (approximately 1,000 angstroms thick) extending over both the P-type regions 48 and 50. Ohmic contacts are made to the regions 48 and 50 by metallization directly in contact with these regions. An examination of the MOS transistor of FIG. 2 reveals that it is also a PNP, lateral surface, bipolar transistor. This dual nature is detrimental to the operation of a capacitor pullup-type shift register in that the PN junctions sometimes act as sources of injected current. For example, consider the drive transistor 14 when a control pulse is connected to the gate terminal 14*g*. With the drive transistor 14 turned on, the equivalent circuit of the capacitor 16 and the transistor 14 is shown in FIG. 3A. Inherent in the structure of the transistor 14 is a small resistance 52 between the drive terminal 14*d* and the source terminal 14*s* when the transistor conducts. The PN junction between the region 50 and the substrate 46 will appear as the diode 54. This is a simple differentiating circuit which will clamp the junction 22 at a positive voltage equal to the forward voltage drop of the diode 54.

Referring to FIG. 3B, consider that a clock pulse $\Phi_1$ appears at terminal 18 when the switch 14 is closed. The leading edge of the clock pulse $\Phi_1$ will be differentiated to produce a negative going pulse 56 at the junction 22. When the clock pulse $\Phi_1$ is turned off, the differentiating circuit of the capacitor 16 and the resistor 52 will produce a positive going pulse 58. However, the clamping action of the diode 54 limits the positive going pulse 58 to about 0.6 volts. It is this clamping action that produces one mode of injection current.

Figure 4A:
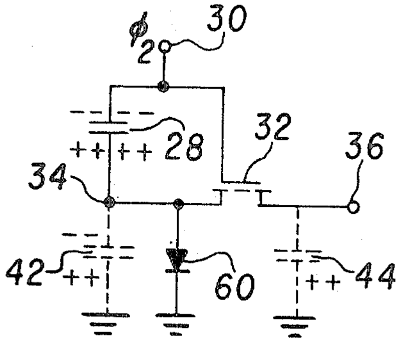
FIG. 4A illustrates the equivalent circuit that produces a second injection current mode in the circuit of FIG. 1 in an MOS transistor configuration.
Figure 4B:
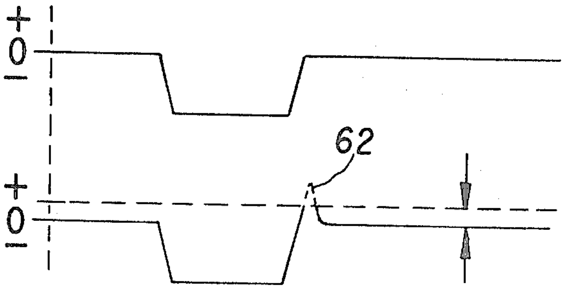
FIG. 4B illustrates a clock pulse wave and the voltage spike causing the second injection current mode.

Next consider the case where the driver transistor 26 is turned off presenting an open circuit between the junction 34 and ground. In this situation, the capacitor 28 and the transistor 32 present the equivalent circuit illustrated in FIG. 4A to a clock pulse $\Phi_2$ on the terminal 30. Again, the capacitors 42 and 44 are inherent in the structure of a field-effect transistor. When a clock pulse $\Phi_2$ occurs at the terminal 30, the voltage at the junction 34 will follow the clock pulse voltage. The clock pulse is essentially connected to the output terminal 36 through the transistor 32. With $\Phi_1$ in the steady state, on condition, the voltage at the junctions 34 and 36 will be given by the expression:

$$V_{34} \simeq \left[\frac{C_{28}}{C_{28}+C_{42}+C_{44}}\right] V_{\phi_2} \quad (1)$$

where $C_{28}$, $C_{42}$, and $C_{44}$ equals the capacitance of the respective capacitors, and $V_{\phi_2}$ equals the clock pulse voltage. A charge stored on the capacitor 28 must equal the sum of the charges stored on the capacitors 42 and 44. When the clock pulse $\Phi_2$ turns off, as illustrated in FIG. 4B, the charge on capacitor 44 is trapped and essentially subtracts from the charge at the junction 34. This creates a net positive charge at the junction 34 which means the voltage at this junction will go positive. However, the PN junction diode between the drain region 50 and the substrate 46 clamps the positive voltage to about 0.6 volts, as illustrated in FIG. 4B. This clamping action causes the second mode of injection current. The two modes of injection current will have deleterious effects on the operation of the shift register bit of FIG. 1.

Figure 5:
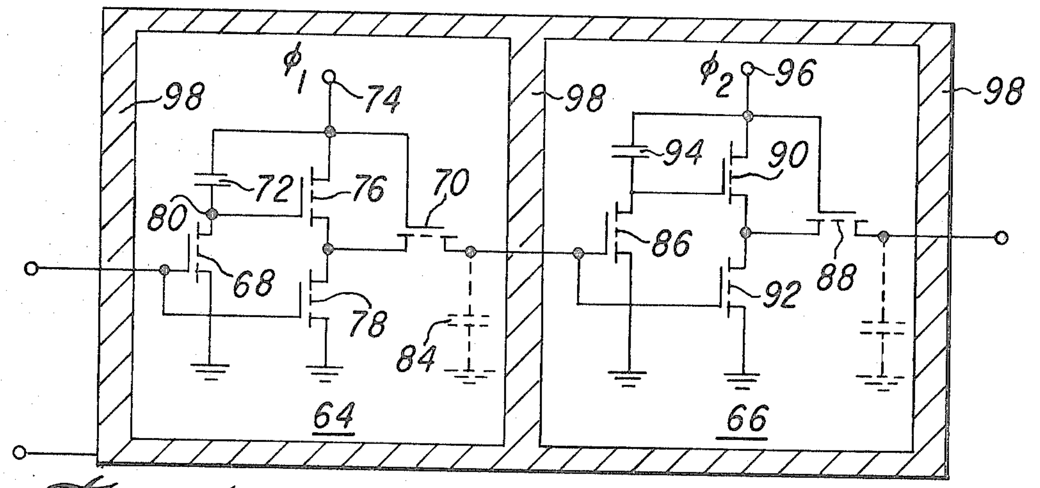
FIG. 5 is a circuit diagram of a capacitor pullup, push-pull shift register bit in accordance with the present invention.

Referring to FIG. 5, there is shown a circuit for minimizing the effects of mode one injection currents and eliminating mode two injection currents. The shift register bit of FIG. 5 includes a first transfer stage 64 in cascade with a second transfer stage 66. Stage 64 includes a driver transistor 68 and a coupling transistor 70, with the gate terminal of the transistor 68 connecting the register bit to a control pulse. A load capacitor 72 is in series with the drain-source regions of the transistor 68 and connects to a terminal 74 for receiving clock pulses $\Phi_1$. Clock pulses on the terminal 74 also controls conduction through the coupling transistor 70 by a connection to the gate terminal thereof. To eliminate mode two injection currents, two series-connected transistors 76 and 78 are interconnected between the drive transistor 68 and the coupling transistor 70. Transistors 76 and 78 form a drain-source-drain-source circuit between the control pulse $\Phi_1$ and ground. Transistor 78 is switched into a conduction state at the same time transistor 68 is similarly switched by control pulses coupled to the gate terminal. Transistor 76 is activated into a conducting state by a negative going voltage at the junction 80 between the capacitor 72 and the transistor 68.

In operation, with a negative control pulse applied to the gate terminals of the transistors 68 and 78, both these transistors will be in a switching mode and connect the junctions 80 and 82, respectively, to ground. Should a control pulse $\Phi_1$ appear at the terminal 74 during this time, both the junctions 80 and 82 will remain at ground potential and the transistor 76 will be nonconducting. Next, assume that the control pulse to the transistors 66 and 78 is turned off. Both these transistors will now be nonconducting and the junction 80 will follow the clock pulse voltage upon the occurrence of a pulse at the terminal 74, thereby turning on the transistor 76. At the same time, the control pulse $\Phi_1$ will turn on the transistor 70 and the interelectrode capacitor 84 will be charged to the clock pulse voltage. Now, however, the charging circuit for the capacitor 84 does not include the load capacitor 72, but, rather, only the transistors 76 and 70. When the clock pulse $\Phi_1$ is again turned off, the transistor 76 is switched to a nonconducting mode along with the transistor 70. Second mode injection currents will not be generated because of the absence of an unbalance of charge in the circuit.

The transfer stage 66 is similar to the transfer stage 64; it includes a driver transistor 86 and a coupling transistor 88 along with an active series circuit of two transistors 90 and 92. A load capacitor 94 connects to a junction of the gate terminal of the transistor 90 and the drain terminal of the transistor 86. A clock pulse $\Phi_2$ supplies the driving current for the transfer stage 66 through a connection to the terminal 96.

Although the circuit of FIG. 5 eliminates mode two injection currents, mode one injection currents will be present. In the MOS transistor configuration, the effect of these currents can be minimized by a P-type diffusion 98 into the substrate that completely encircles each of the transfer stages. These collection diffusions will trap a substantial percentage of the mode one injection currents.

Figure 6:
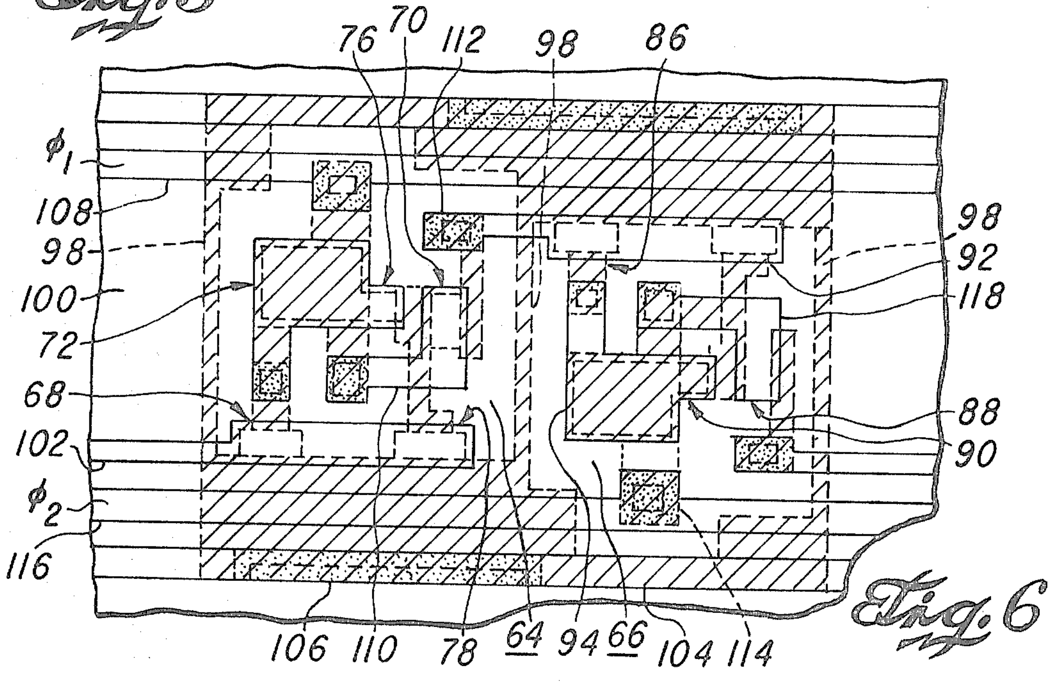

Referring to FIG. 6, there is shown the circuit of FIG. 5 embodied in an integrated circuit configuration. This is merely a fragmentary view of a complete shift register which may comprise many of the register bits of FIG. 5 on a single semiconductor wafer 100. Typically, the semiconductor wafer may be an N-type silicon. All P-type diffusions into the substrate 100 are identified in FIG. 6 by cross hatching. For example, the P-type diffusion collection ring 98 surrounds both the transfer stage 64 and the transfer stage 66. An input control pulse to the metal conductor 102 (all metallizations are outlined by heavy lines) connects to the gate region of the transistors 68 and 78. The P-type source regions of the transistors 68 and 78 are formed as part of the collection ring 98 and connected to ground by means of a metal conductor 104 through an ohmic contact 106. All ohmic contacts through the oxide layer overlaying the substrate 100 are illustrated in FIG. 6 by shading. The P-type drain region of the transistor 68 is in contact with a metallization region that forms one plate of the capacitor 72. This same metallization area also extends to the gate region of the transistor 76. The second plate of the capacitor 72 is a P-type diffusion which extends from a metal conductor 108, which carries the control pulse $\Phi_1$ to a metal conductor 110 that extends to the gate region of the transistor 70. The P-type drain region of the transistor 70 extends to and is in contact with a metal conductor 112 that forms a connecting link between the transfer stage 64 and the gate regions of the transistors 86 and 92 of the transfer stage 66. One plate of the capacitor 94 is a metallization region that extends to the drain region of the transistor 86 and the gate region of the transistor 90. The second plate of the capacitor 94 is a P-type diffusion connected through an ohmic contact 114 to a metal conductor 116 to which is connected the control pulse $\Phi_2$. This same P-type diffusion is in ohmic contact with a metal conductor 118 that extends to the gate region of the transistor 88. The P-type drain region of the transistor 88 is in ohmic contact with a metal conductor 120 that conducts output pulses from the register bit shown to the subsequent register bit.

To fabricate a register bit in an MOS transistor configuration in the layout illustrated in FIG. 6, the N-type silicon substrate 100 is coated with a silicon oxide layer approximately 5,000 angstroms thick in the usual manner of oxide deposition. Openings are formed in the oxide coating by photo resist masking and etching to outline the areas of P-type diffusions. In one operation, all the P-type diffusions required for a complete shift register are made simultaneously. An additional silicon oxide layer is then grown over the entire substrate to a total thickness of about 15,000 angstroms. Openings are again formed in the oxide coating by photoresist masking and etching for the purpose of outlining the ohmic contacts for the source and drain regions, and for outlining the gate region. A thin oxide layer is then grown over the entire substrate to about a thickness of 1,000 angstroms to form the dielectric region for the gate regions and the capacitors. This thin oxide layer is then stripped from the ohmic contact areas for the source and drain regions of the transistors and for other ohmic contact regions. The final step in the fabrication process is metallization of the entire substrate to form the ohmic contacts and one plate of the capacitors 72 and 90. This metallization layer is patterned by a photoresist masking and etching operation. Where required, lead wires are then bonded to the metallization areas.

Figure 7:
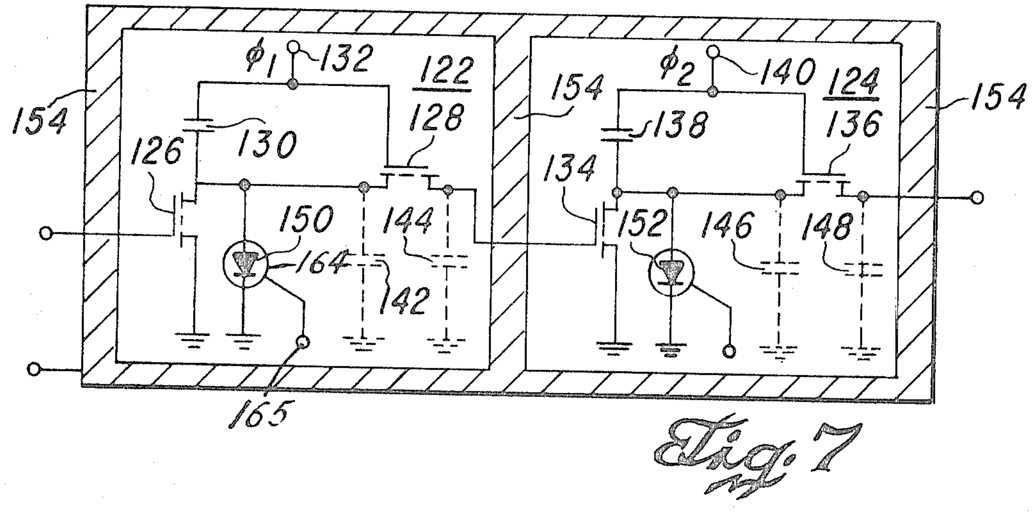
FIG. 7 is a circuit diagram of a capacitor pullup shift register in accordance with an alternate embodiment of the present invention.

Referring to FIG. 7, there is shown an alternate circuit for minimizing mode one and mode two injection currents. Each of the transfer stages 122 and 124 include a driver transistor switch and a coupling transistor switch. Transfer stage 122 comprises transistor 126 coupled through a drain terminal to the source terminal of a transistor 128. A load capacitor 130 connects to the junction of the transistors 126 and 128 and to clock pulses $\Phi_1$ at a terminal 132. Clock pulses on the terminal 132 also control conduction through the transistor 128 by connection to the gate terminal thereof. The transfer stage 124 includes a transistor 134 having a drain terminal connected to the source terminal of a transistor 136. A load capacitor 138 connects to the junction of the transistors 134 and 136 and to clock pulses $\Phi_2$ on a terminal 140. Clock pulses $\Phi_2$ on the terminal 140 also drive the transistor 136 through a connection to the gate terminal. Interelectrode capacitors 142, 144, 146 and 148 are shown as part of the transfer stages 122 and 124.

To control mode two injection currents into the transfer stages 122 and 124, an alloy junction diode is included in each stage. A diode 150 controls mode two injection currents in the transfer stage 122 and a diode 152 controls mode two injection current into the transfer stage 124. Returning to the discussion of FIGS. 4A and 4B, it was noted that the equivalent circuit for the coupling transistor of a transfer stage includes a PN junction diode and clamping action of this diode produced mode two injection currents. The diodes 150 and 152 are connected in parallel to the inherent PN diode of the transistors 128 and 136, respectively. Alloy diodes conduct at a lower forward voltage, thus shunting a portion of the charges on the load capacitor to ground prior to conduction of the PN diode of the transistors.

Figures 8, 9:
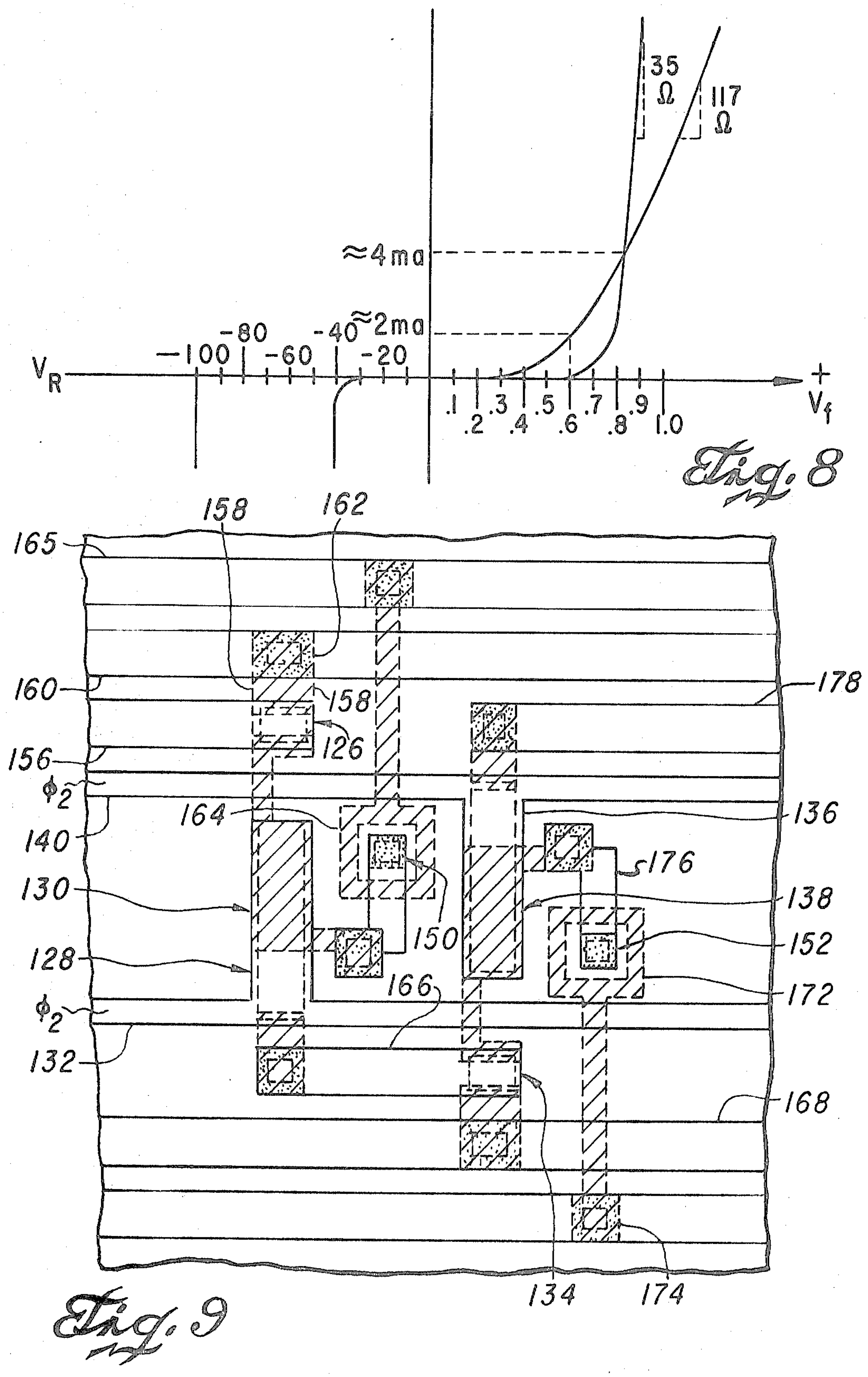
FIG. 8 is a plot of the forward and reverse current versus voltage characteristics of a junction diode and an alloy diode.
FIG. 9 shows a detailed layout of a basic bit drawn for the circuit of FIG. 7.

Referring to FIG. 8, there is shown a plot of forward and reverse characteristics of a PN junction diode and an alloy junction diode. Considering only the forward diode characteristics, an alloy diode begins to conduct at approximately 0.3 volts. A PN junction diode, however, does not begin to conduct until approximately 0.6 volts. At a forward voltage of 0.6 volts, the alloy diode is already conducting at approximately a 2 milliamp level. An alloy diode will continue to conduct more heavily than a junction diode until about 0.8 volts, or a forward current of approximately 4 milliamps. Thus, by paralleling an alloy diode, or Schottky barrier diode, with the inherent PN junction diode of an MOS transistor, mode two injection currents can be significantly reduced. Mode one injection currents for the circuit of FIG. 7 may be collected by a P-type diffusion 154 forming collection rings about the transfer stages.

Referring to FIG. 9, there is shown the circuit of FIG. 7 embodied in an integrated circuit configuration. Again, this is merely a fragmentary view of a complete shift register which may comprise many of the register bits of FIG. 7 on a single semiconductor wafer. Input pulses to the register bit of FIG. 9 are received at a metal conductor 156 terminating at the gate region of the transistor 126. A P-type diffusion 158 forms the source region of the transistor 126 and is in ohmic contact with a ground bar 160. The ohmic contact between the bar 160 and the diffusion 158 is indicated by the shaded area 162. Ohmic contacts between the metal areas and the P-type diffusions are all indicated by shading. The drain region of a transistor 126 is a P-type diffusion that extends as one plate of the load capacitor 130. The second plate of the capacitor 130 is a metallized area which encompasses the gate region of the transistor 128 and the terminal 132 for receiving the clock pulses $\Phi_1$. The alloy diode 150 is fabricated from a metallized area in ohmic contact with a P-type diffusion that forms part of the capacitor 130. A P-type diffusion collection ring 164 encircles the diode 150 to further enhance the collection of mode two currents. The collection ring 164 connects to a bar 165 connected to a source of DC voltage.

The interconnection between the transfer stage 122 and the transfer stage 124 is through a metal conductor 166 extending over the gate region of the transistor 134. The source region of the transistor 134 connects to a ground bar 168. The drain region is a P-type diffusion forming one plate of the capacitor 138. The second plate of the capacitor 138 extends over the gate region of the transistor 136 and is part of the terminal 140 for receiving clock pulses $\Phi_2$. An extension of the P-type diffusion of the capacitor 138 is in ohmic contact with a metal conductor 170 forming one part of the alloy diode 152. A P-type diffusion collection ring 172 encircles the diode 152 and connects to a source of DC current through an ohmic contact 174 to a metal conductor 176.

The output of the register bit of FIG. 9 appears on a conductor 178 which connects to the driver transistor of a subsequent register bit, or to a buffer stage amplifier.

While several embodiments of the invention, together with modifications thereof, have been described in detail herein and shown in the accompanying drawings, it will be evident that various further modifications are possible without departing from the scope of the invention.

We claim:

1. A transfer stage in a capacitor pullup, push-pull register bit coupled to a clock pulse source of driving energy comprising:

a load capacitor having one plate thereof connected to the pulse source;

a driver electronic switch having a drain terminal connected to the second plate of said load capacitor, a gate terminal for receiving control pulses to the transfer stage, and a source terminal tied to a reference voltage;

a coupling electronic switch having a source terminal, a gate terminal connected to the clock pulse source, and a drain terminal connected to an output port; and switching means coupled between the drain terminal of the driver switch and the source terminal of the coupling switch, and connected to the clock pulse source and to the control pulse to the transfer stage for transferring pulse information from said driver switch to said coupling switch.

2. A transfer stage in a capacitor pullup, push-pull register bit as set forth in claim 1 wherein said switching means includes: first and second electronic switches coupled in series to the source terminal of said coupling switch and energized to a conducting mode by control pulses to the transfer stage and the output of the driver switch, respectively.

3. A transfer stage in a capacitor pullup, push-pull register bit as set forth in claim 2 wherein said electronic switches of the switching means comprise field-effect transistors connected in series from the clock pulse source to ground and individually controlled by control pulses to the transfer stage and the voltage at the drain terminal of the driver switch.

4. A transfer stage in a capacitor pullup, push-pull register bit as set forth in claim 2 wherein the driver, the coupling, and the electronic switches of the switching means comprise metal-insulator-semiconductor field-effect transistors.

5. A transfer stage in a capacitor pullup, push-pull register bit coupled to a clock pulse source of driving energy comprising:

a driver electronic switch having a drain terminal, a gate terminal for receiving control pulses to the transfer stage, and a source terminal tied to a reference voltage;

a first intermediate electronic switch having a drain terminal, a gate terminal interconnected to the gate terminal of said driver switch, and a source terminal tied to a reference voltage;

a second intermediate electronic switch having a drain terminal, a gate terminal connected to the drain terminal of said driver switch, and a source terminal tied to the drain terminal of said first intermediate switch;

a coupling electronic switch having a gate terminal, a source terminal coupled to the interconnection between said first and second intermediate switches, and a drain terminal connected to an output port; and a load capacitor having one plate connected to the drain terminal of said driver switch and a second plate interconnected with the drain terminal of the second intermediate switch and the gate terminal of the coupling switch to the clock pulse source.

6. A capacitor pullup, push-pull register bit of a shift register comprising:

a first transfer stage coupled to a first clock pulse source and including a driver electronic switch having a first terminal, a control terminal for receiving control pulses to the first transfer stage, and a third terminal at a ground potential, a coupling electronic switch having first and second terminals, and a control terminal coupled to the first clock pulse source, and active circuit means for connecting the clock pulses to the second terminal of said coupling switch, said active circuit means actuated by the control pulses to the first stage and the voltage level at the first terminal of said driver switch; and a second transfer stage coupled to a second clock pulse source and including a first electronic switch having first and second terminals, and a control terminal for receiving control pulses from said first transfer stage, a coupling electronic switch having first and second terminals and a control terminal connected to the second clock pulse source, and active circuit means for connecting said second clock pulse source to the second terminal of said coupling switch, said active circuit means activated by control pulses from said first transfer stage and the voltage signal on the first terminal of said driver switch.

7. A capacitor pullup, push-pull register bit as set forth in claim 6 wherein the active means of said first and second transfer stages includes a pair of electronic switches in series with the interconnection tied to the second terminal of the respective coupling electronic switch.

8. A capacitor pullup, push-pull register as set forth in claim 7 wherein the electronic switches of said first and second stage are metal-insulator-semiconductor field-effect transistors.

9. A transfer stage in a capacitor pullup register bit coupled to a clock pulse source of driving energy comprising:

a capacitor having a first plate connected to a clock pulse source;

a first transistor having a first terminal connected to the second plate of said capacitor, a control terminal for receiving control pulses to the transfer stage, and a third terminal tied to a reference voltage;

a second transistor having a first terminal connected to an output port, a control terminal coupled to the clock pulse source, and a third terminal connected to a junction of said capacitor and said first transistor; and circuit means including a diode having an anode and a cathode, said anode connected to the junction of said first and second transistors and said cathode connected to ground, said capacitor operative when the voltage at said junction exceeds a threshold level to conduct current from said junction to ground.

10. A transfer stage in a capacitor pullup register as set forth in claim 9 wherein said diode is an alloy junction diode.